(12) United States Patent
Paintz et al.

(10) Patent No.: US 8,593,098 B2
(45) Date of Patent: Nov. 26, 2013

(54) OPERATION OF BLDC MOTORS

(75) Inventors: Christian Paintz, Erfurt-Kerspleben (DE); Thomas Freitag, Plaue (DE)

(73) Assignee: Melexis Technologies NV, Tessenderlo (BE)

( * ) Notice: Subject to any disclaimer, the term of this patent is extended or adjusted under 35 U.S.C. 154(b) by 346 days.

(21) Appl. No.: 12/634,991

(22) Filed: Dec. 10, 2009

(65) Prior Publication Data
US 2010/0141192 A1    Jun. 10, 2010

(30) Foreign Application Priority Data

Dec. 10, 2008  (GB) ................................ 0822515.3

(51) Int. Cl.
*G05B 11/28* (2006.01)
(52) U.S. Cl.
USPC .......................................... 318/599; 318/811
(58) Field of Classification Search
USPC ............. 318/400.01, 400.32, 400.33, 400.34, 318/599, 811
See application file for complete search history.

(56) References Cited

U.S. PATENT DOCUMENTS

| | | | |
|---|---|---|---|
| 4,746,844 A * | 5/1988 | MacKelvie et al. ...... | 318/400.35 |
| 4,772,839 A * | 9/1988 | MacMinn et al. ............ | 318/696 |
| 4,928,043 A | 5/1990 | Plunkett | |
| 4,992,710 A * | 2/1991 | Cassat ...................... | 318/400.33 |
| 5,001,405 A * | 3/1991 | Cassat ...................... | 318/400.33 |
| 5,097,190 A * | 3/1992 | Lyons et al. .................. | 318/701 |
| 5,134,349 A | 7/1992 | Kruse | |
| 5,144,209 A | 9/1992 | Inaji et al. | |
| 5,191,269 A | 3/1993 | Carbolante | |
| 5,191,270 A * | 3/1993 | McCormack ............ | 318/400.11 |
| 5,384,527 A | 1/1995 | Rozman et al. | |
| 5,473,240 A | 12/1995 | Moreira | |
| 5,517,095 A | 5/1996 | Carobolante et al. | |
| 5,525,874 A | 6/1996 | Mallarapu et al. | |
| 5,796,235 A | 8/1998 | Schrodl et al. | |
| 5,859,512 A | 1/1999 | Burhker | |

(Continued)

FOREIGN PATENT DOCUMENTS

| EP | 0 892 489 A1 | 1/1999 |
|---|---|---|
| EP | 1 478 086 A | 11/2004 |

OTHER PUBLICATIONS

International Search Report issued Feb. 23, 2007 for PCT/IB/2006/002430 with an International Filing Date of Sep. 4, 2006 [corresponding to U.S. Appl. No. 12/065,598].

(Continued)

*Primary Examiner* — Rina Duda
(74) *Attorney, Agent, or Firm* — Leydig, Voit & Mayer, LLP; Gerald T. Gray

(57) ABSTRACT

The present invention there is provides a method of determining the rotor position in an electric motor comprising the steps of: superimposing one or more alternating signals on to the driving waveform so as to generate one or more oscillating currents in the stator coils; monitoring the variation in magnitude of the oscillating currents and thereby determining the rotor position. Typically, two alternating signals are applied in opposition so as to have no net effect on the torque applied by the driving waveform. Using this technique rotor position estimation can be obtained at start-up from stand-still and at low to medium speeds. The method can be used in applications where a fast motor start is needed under unknown load conditions and can be used to detect when the rotor has passed a certain position that coincides with the commutation instance.

12 Claims, 8 Drawing Sheets

(56) References Cited

U.S. PATENT DOCUMENTS

| | | | |
|---|---|---|---|
| 5,859,520 A | 1/1999 | Bourgeois et al. | |
| 6,011,368 A * | 1/2000 | Kalpathi et al. | 318/434 |
| RE36,568 E | 2/2000 | Horst | |
| 6,023,141 A | 2/2000 | Chalupa | |
| 6,034,493 A | 3/2000 | Boyd et al. | |
| 6,072,289 A | 6/2000 | Li | |
| 6,081,091 A | 6/2000 | Mitchell et al. | |
| 6,107,772 A * | 8/2000 | Liu et al. | 318/701 |
| 6,124,689 A | 9/2000 | Kardash | |
| 6,163,120 A | 12/2000 | Menegoli | |
| 6,531,843 B2 * | 3/2003 | Iwaji et al. | 318/727 |
| 6,583,593 B2 * | 6/2003 | Iijima et al. | 318/400.32 |
| 6,661,192 B2 | 12/2003 | Copeland | |
| 6,795,268 B1 | 9/2004 | Ryan | |
| 6,825,646 B2 * | 11/2004 | Colombo | 324/76.77 |
| 6,885,163 B2 | 4/2005 | Heidrich | |
| 6,979,970 B2 | 12/2005 | Iwanaga et al. | |
| 6,995,530 B2 * | 2/2006 | Biamonte et al. | 318/400.33 |
| 7,138,776 B1 | 11/2006 | Gauthier et al. | |
| 7,141,949 B2 | 11/2006 | Harwood | |
| 7,166,980 B1 | 1/2007 | LeGrand | |
| 7,180,262 B2 * | 2/2007 | Consoli et al. | 318/705 |
| 7,202,618 B2 * | 4/2007 | Ide et al. | 318/400.12 |
| 7,245,104 B2 * | 7/2007 | Tomigashi et al. | 318/705 |
| 8,030,867 B1 | 10/2011 | Allison, III | |
| 8,063,591 B2 | 11/2011 | Yamamoto | |
| 2001/0048278 A1 | 12/2001 | Young et al. | |
| 2004/0056627 A1 | 3/2004 | Grasso et al. | |
| 2004/0075407 A1 | 4/2004 | Ohiwa et al. | |
| 2004/0263104 A1 | 12/2004 | Iwanaga et al. | |
| 2005/0146296 A1 | 7/2005 | Klemm et al. | |

OTHER PUBLICATIONS

Schmidt, et al. "Initial Rotor Angle Detection of a Non-Salient Pole Permanent Magnet Synchronous Machine," IEEE Industry Society, Annual Meeting, New Orleans, Louisiana (Oct. 5-9, 1997).

Non-Final Office Action issued Sep. 13, 2012 corresponding to U.S. Appl. No. 12/065,598 (19 pages).

Non-Final Office Action issued Jan. 18, 2013 corresponding to U.S. Appl. No. 13/061,069 (14 pages).

* cited by examiner

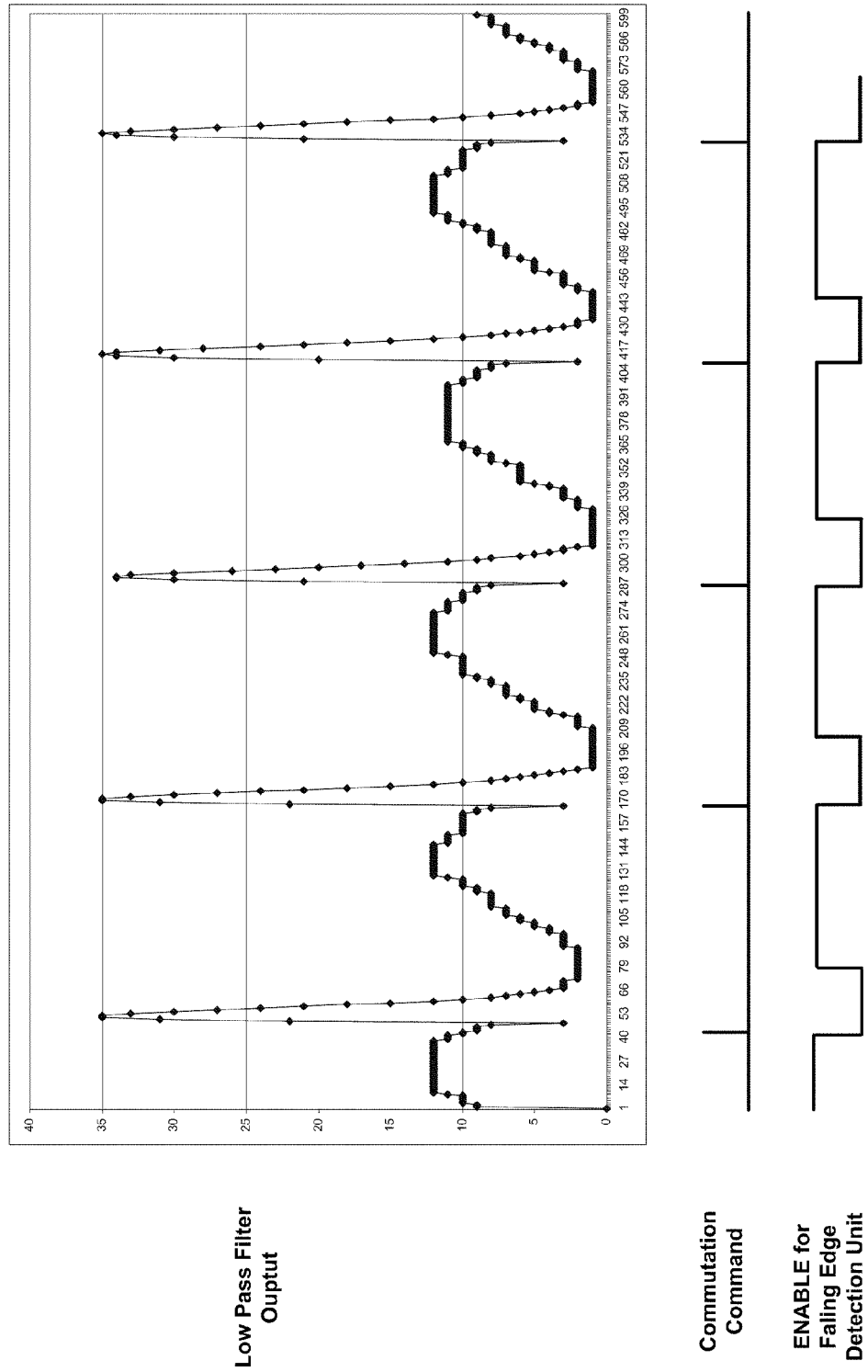

OPERATION OF BLDC MOTORS

This application claims priority to UK Patent Application Number 0822515.3, filed on Dec. 10, 2008.

BACKGROUND

The present invention relates to the operation of BLDC motors and in particular to the operation of BLDC motors at start up and at low to medium speeds.

Driving of BLDC motors requires the knowledge of the rotor position relative to the stator coils. For a given rotor position, a current is forced through the stator coils in the appropriate direction to generate torque so as to turn the rotor in a desired direction. When the rotor has turned beyond a certain position, (the commutation point), the current direction needs to be varied (commutated) so that it is again in the appropriate direction to generate torque in the desired direction.

In some implementations, the rotor position information can be determined using sensors, such as Hall-effect sensors or by appropriate means. In other implementations, the BEMF voltage induced in the stator coils by the rotor can be monitored to determine rotor position. These methods work best when the motor is operating at a steady speed above a particular threshold speed. Rotor position detection by these methods is thus less reliable at slow speeds and at start up or in conditions where the load on the motor varies over a wide range. For example, this may occur in motors used to drive oil pumps. Due to the strong dependency of oil viscosity on temperature, the required starting torque can vary by a factor 100 or more. Other examples include motors used in applications such as pumps, fans or actuators where operation at near-zero-speed is required.

These issues have been addressed in IEEE Industry Applications Society, Annual Meeting, New Orleans, La., Oct. 5-9, 1997; "Initial Rotor Angle Detection Of A Non-Salient Pole Permanent Magnet Synchronous Machine," Peter B. Schmidt, Michael L. Gasperi, Glen Ray, Ajith H. Wijenayake; Rockwell Automation wherein six current pulses are imposed on the driving waveform of a motor and the current rise times are evaluated to determine rotor position. The problems are also addressed in U.S. Pat. No. 6,885,163, wherein only two test pulses are used, timed to occur when the rotor position is known to be within a range of 60° of a particular estimated position. Both of these methods have the draw back that a currentless waiting time is needed before starting the next test pulse in order to accurately compare the measured rise times. During this currentless waiting time, the torque producing current is interrupted and hence it is not possible to deliver a maximum torque. Additionally, the interruption of the torque can lead to unstable start-up, especially under heavy load conditions.

An alternative way of addressing this problem is disclosed in U.S. Pat. No. 5,796,235. In this scheme, test pulses are imposed at intervals and the current change is measured differentially at the beginning and the end of each test pulse. These dI/dt values are then evaluated by a complex trigonomic function to calculate the current rotor position. Accordingly, it does not suffer from the drawback that the test pulse currents must have decayed before the next pulse can be initiated. However, the position is only measured when test pulses are inserted and insertion of test pulses also distorts the torque.

BRIEF SUMMARY

It is an object of the present invention to provide an improved method of commutating a BLDC motor that at least partly overcomes or alleviates the above problems.

According to a first aspect there is provided a method of determining the rotor position in an electric motor comprising the steps of: superimposing one or more alternating signals on to the driving waveform so as to generate one or more oscillating currents in the stator coils; monitoring the variation in magnitude of the oscillating currents and thereby determining the rotor position.

According to a second aspect there is provided an electric motor operating in accordance with the method of the first aspect of the present invention.

Various embodiments can be used to obtain rotor position estimation at start-up from stand-still and low to medium speeds. The method can be used in applications where a fast motor start is needed under unknown load conditions. It takes advantage of the impact that the rotors permanent magnets have on the stator coil inductances. The method is furthermore independent of the BEMF voltage. The present invention can be used to detect when the rotor has passed a certain position that coincides with the commutation instance.

Various embodiments can be combined with known methods for estimating an initial rotor position by way of applying test pulses and/or with known methods for estimating rotor position by way by evaluating BEMF voltage in an undriven coil.

In one implementation, the motor may be a switched reluctance motor. In a preferred implementation, the motor may be a brushless direct current (BLDC) motor. The BLDC motor may have any suitable number of stator coils.

The driving waveform may be operated with a PWM duty cycle. The driving wave form may be operated with either a soft switching or hard switching PWM duty cycle.

Preferably two alternating signals are applied. The alternating signals may be adapted such that they have a net torque effect in the same direction as the driving waveform. The amplitude of the oscillating currents may be monitored to determine the rotor position. Preferably, the amplitude of the difference between the two oscillating currents is monitored to determine rotor position. Rotor position may be determined by reference to maxima or minima in the monitored currents or difference.

The rotor position may be determined by reference to a plurality of sectors, each sector being defined by two commutation points. The amplitude of the difference between the two oscillating currents may reach a minima or maxima at the commutation points. When it is determined that the rotor is at a commutation point, a commutation command may be output. In response to the commutation command the driving waveform may be commutated.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In order that the invention may be more clearly understood, it is described further below, by way of example only, and with reference to the accompanying drawings, in which:

FIG. 7 illustrates the outputs of various components of the circuitry of FIG. 5 during operation according to one embodiment.

DETAILED DESCRIPTION

Figure 1:
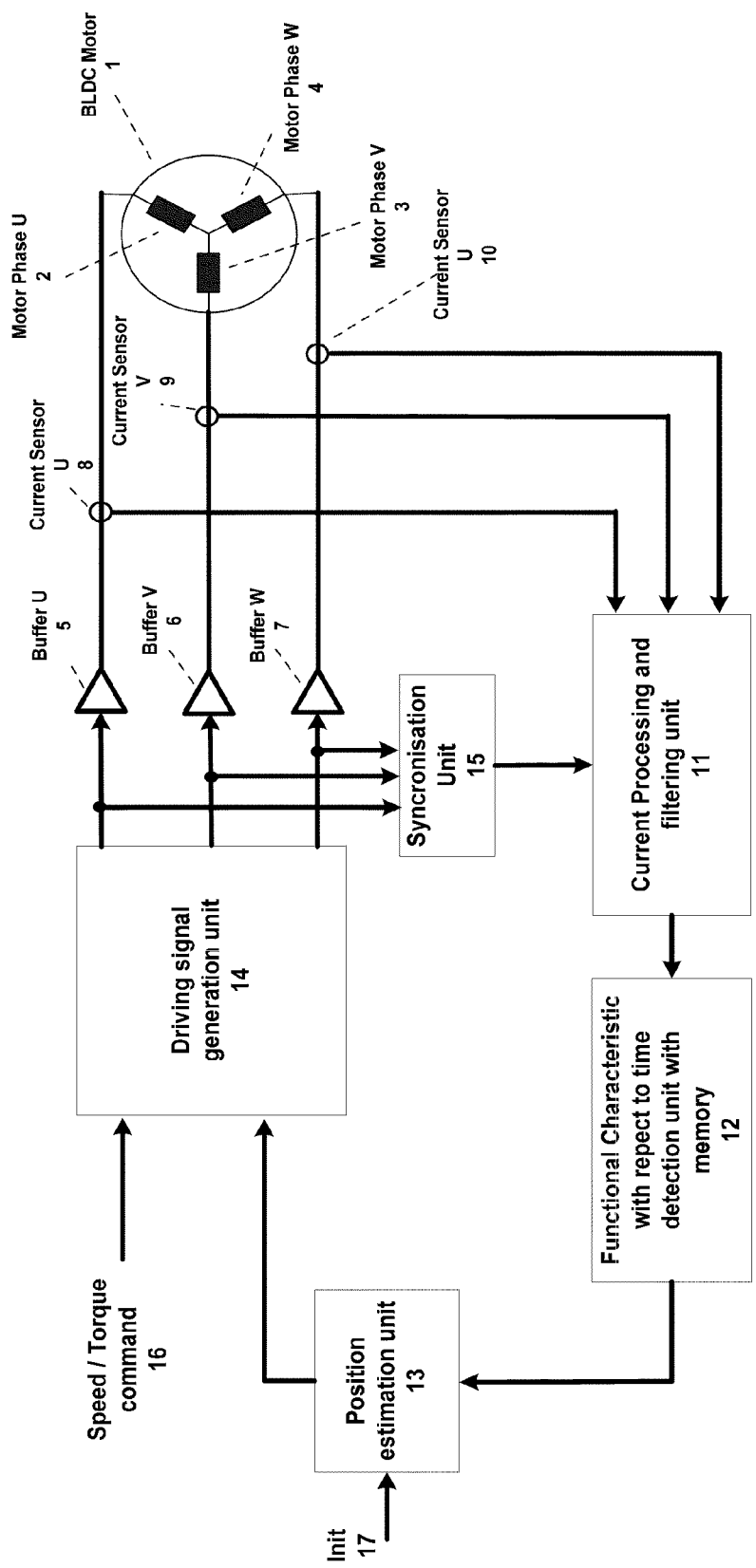
FIG. 1 is a schematic block diagram of a BLDC motor according to one embodiment.

Referring now to FIG. 1, a generalized BLDC motor 1 according to one embodiment comprises a permanently magnetic rotor R and three driving phases U, V, W in the form of stator coils. The phases U, V, W are individually driven via buffers 5, 6, 7 respectively. The current flowing in each phase U, V, W is monitored by respective current sensors 8, 9, 10. The motor is driven by a driving waveform generated by driving signal generation unit 14. The driving signal comprises a torque generating waveform applied to one or more of the phases U, V, W in turn to generate a torque on the rotor, the one or more phases the waveform is applied to being commutated as the rotor position changes. In addition to the driving signal, one or more alternating signals are applied to one or more of the phases U, V, W. The one or more alternating signals generate oscillating currents in the stator coils U, V, W which are detected by current sensors 8, 9, 10. In preferred embodiments, two alternating signals may be used, the alternating signals adapted such that superposition of the alternating signals cancels out the direct effect of the alternating signals on the torque generating waveform.

The amplitude of the oscillating currents is dependent upon both the resistance and inductance of the stator coils U, V, W. Typically, the resistance may be dependent upon temperature but is independent of rotor position whereas the inductance is dependent upon the rotor position. As a result, short term variations in the amplitude of the oscillating current can be assumed to be dependent upon the rotor position and thus by monitoring these variations, the rotor position can be determined. Typically, the alternating signals may be arranged such that for a specific motor, the ideal instant for driving waveform commutation coincides with the local maxima or minima of the oscillating current amplitude. Accordingly, the amplitude of the oscillating current may be monitored over time to determine the rotor position and an appropriate time of commutation. This method is reliable even at low operational speeds or with significant load variations.

Analysis of the current signals to determine rotor position is carried out by the position estimation unit 13 in conjunction with maxima/minima detection unit 12, which in turn operates on signals filtered by current processing and filtering unit 11. A synchronization unit 15 synchronizes the operation of the current processing and filtering unit 11 with the current measurement (sampling) instances with the driving signals. The maxima/minima detection unit 12 monitors the incoming signal with respect to time and detects functional extremes. For example, assume that for a specific motor, the ideal instance of commutation coincides with the local minima of the oscillating current amplitude. In this case the unit 12 would compare incoming samples with the previous input sample and signal a commutation command to the unit 13 when the current sample is larger than the previous sample.

Typically, the position estimation unit 13 determines a sector of the motor within which the axis of the rotor lies and determines when the rotor axis passes from one sector to the next. The position estimation unit 13 outputs the current sector (rotor position) information and change of sector information to the driving signal generation unit 14 to enable commutation at the appropriate time. The position estimation unit 13 has an initialization input 17, which enables it to be switched on at motor start up. The driving signal generation unit 14 is also operable in response to signals received via the speed torque command input 16, to vary the magnitude PWM duty cycle or other characteristics of the torque generating waveform to vary the motor speed or the torque generated.

Figure 4A:
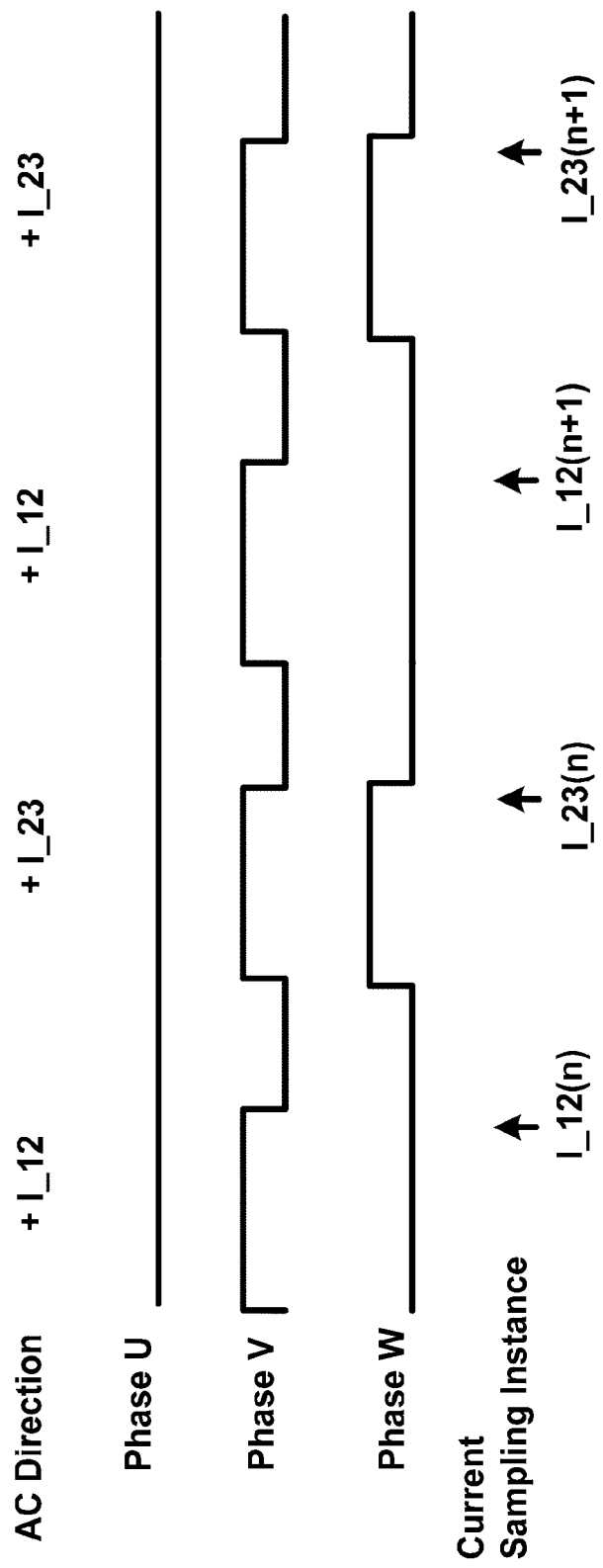
FIG. 4a schematically illustrates the PWM driving wave forms applied to the BLDC motor in order to drive current Q2 of FIG. 2 under soft switching operation and a first alternating signal for the generation of oscillating currents according to the present invention.
Figure 4B:
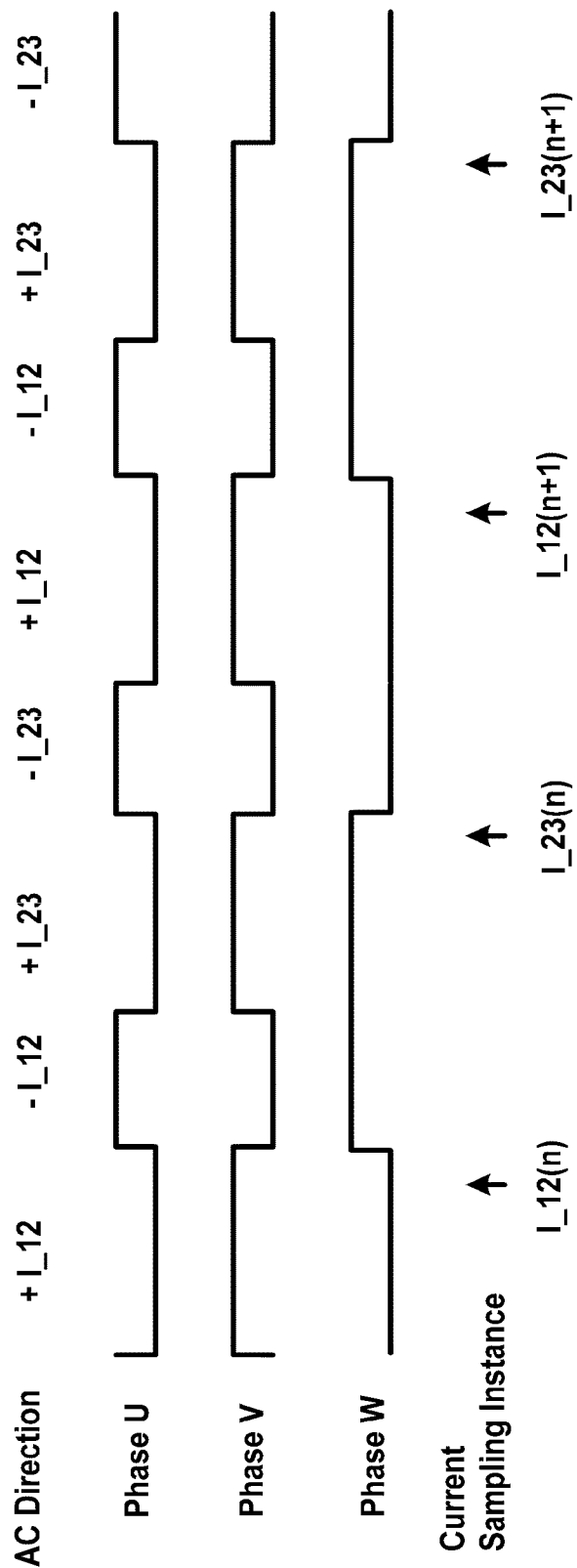
FIG. 4b schematically illustrates the PWM driving wave forms applied to the BLDC motor in order to drive current Q2 of FIG. 2 under hard switching operation and first and second alternating signals for the generation of oscillating currents according to one embodiment.
Figure 5:
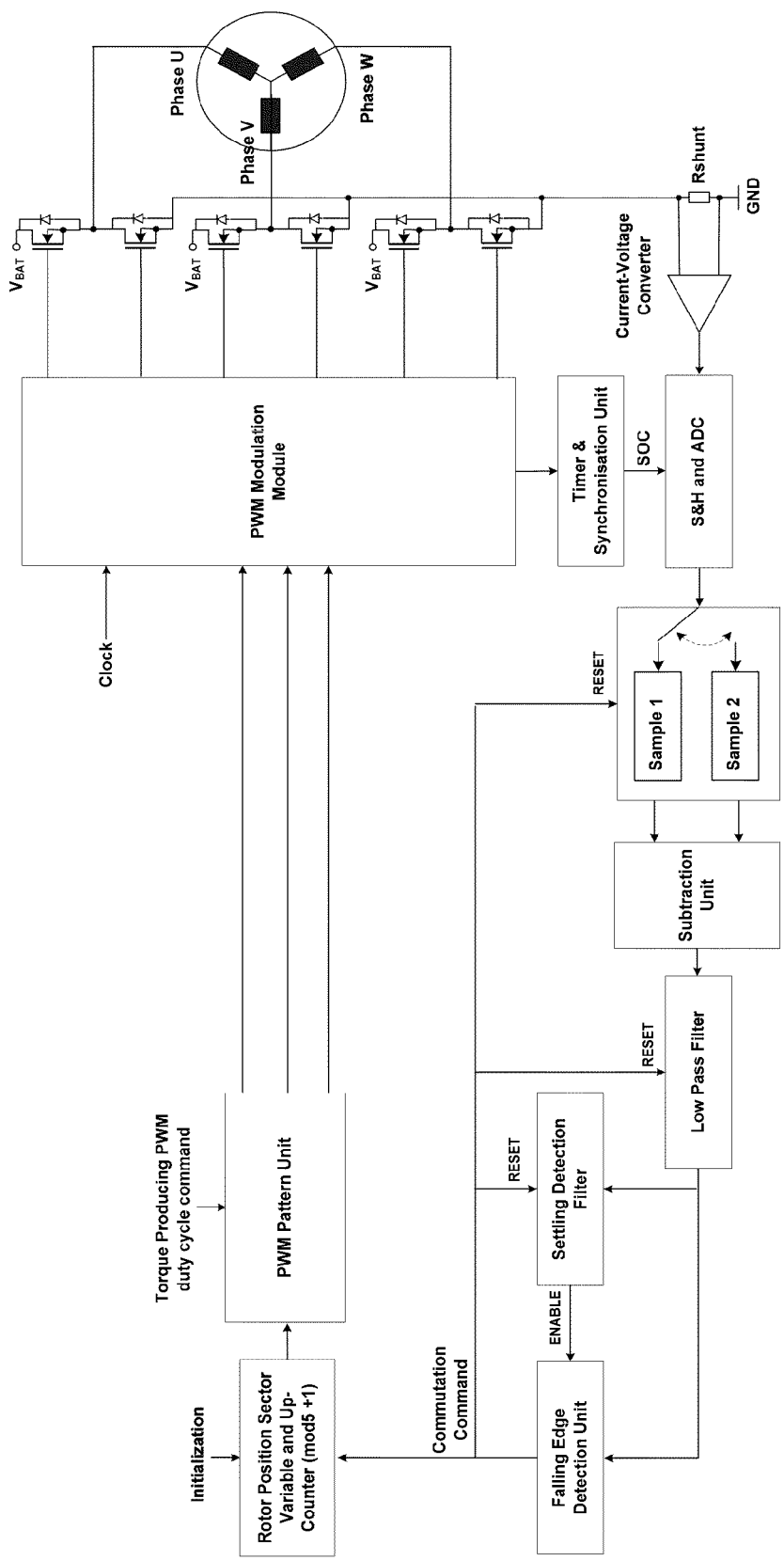
FIG. 5 is a schematic block diagram of a BLDC motor suitable for implementing the method of the present invention illustrating a particular embodiment of circuitry for monitoring and controlling motor operation according to one embodiment.

Another embodiment is described in relation to FIGS. 2-7. As in the previous example the motor comprises three phases (stator coils) U, V, W. The schematic layout of the motor control circuitry as is shown in FIG. 5 will be described further below. For the time being, the orientation of the rotor and the direction of possible signals or alternating signals will be defined with reference to FIGS. 2a and 2b and table 1.

Figure 2B:
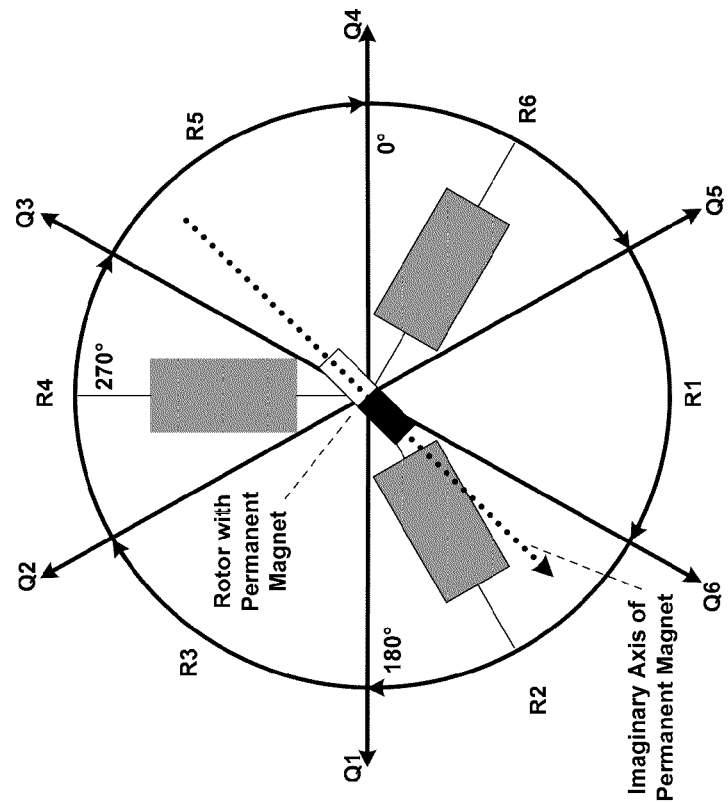
FIG. 2b schematically illustrates the variation of the desired flow direction with rotor position in order to achieve clockwise rotation of the rotor.
Figure 2A:
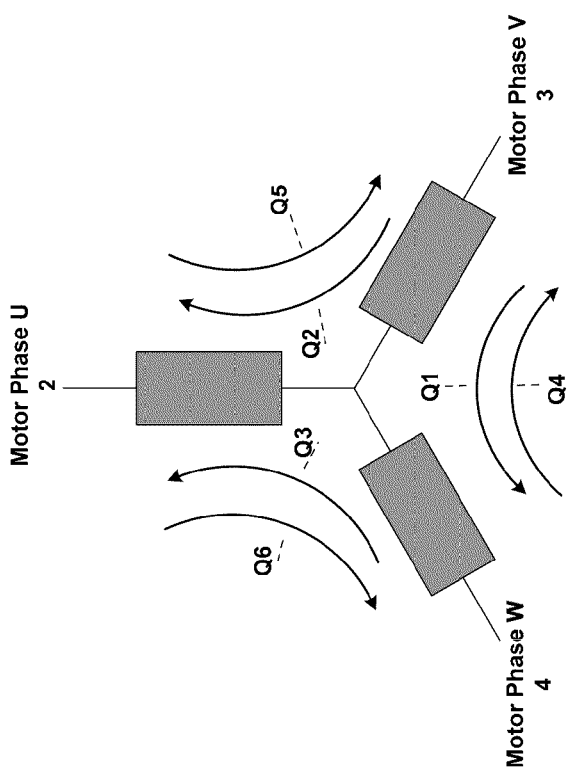
FIG. 2a schematically illustrates the possible current flow directions in the BLDC motor of FIG. 1.

As can be seen in FIG. 2a, there are six possible directions of current flow through pairs of the phases U, V, W labelled as Q1, Q2, Q3, Q4, Q5, Q6. In order to drive current in a particular direction, for example Q2, the effective voltage on one phase (in the example of Q2, phase V) must be larger than the effective voltage on the other connected phase (in the example of Q2, phase V). The voltage difference may be indicative of the speed or torque generated and may be controlled by the speed or torque command input. In typical operation only two phases are driven at one time (in the example of Q2, phase W is undriven). The voltage differences can be achieved by forcing different analogue voltage levels on each phase or by performing a different PWM duty cycle modulation on each phase.

In FIG. 2b, the rotor position is defined by the orientation of its magnetic with respect to sectors R1, R2, R3, R4, R5, R6 with a fixed relation to the phases U, V, W. The rotor position determines which current should be applied in order to accomplish a particular rotation, the labeled directions Q1-Q6 indicating the direction in which the rotor will be urged to align by the corresponding current. In the example of FIG. 2b, the rotor is positioned within sector R2. In order to rotate the rotor clockwise, current Q2 is applied. In response to the current Q2, the rotor will try to align itself with the direction of Q2 and will thus move to sector R3. As soon as the rotor crosses the boundary (at 180°) and enters sector R3, the current is commutated to direction Q3, in order to maintain a constant torque. Table 1 shows the relation between the torque producing current and the rotor sector for clockwise rotation.

| Rotor Angle | Rotor-axis section | Torque Producing Current for clock wise rotation | Alternating Current 1 | Alternating Current 2 |
| --- | --- | --- | --- | --- |
| 60 ... 120 | R1 | Q1 | Q6 ‖ Q1 | Q1 ‖ Q2 |
| 120 ... 180 | R2 | Q2 | Q1 ‖ Q2 | Q2 ‖ Q3 |
| 180 ... 240 | R3 | Q3 | Q2 ‖ Q3 | Q3 ‖ Q4 |
| 240 ... 300 | R4 | Q4 | Q3 ‖ Q4 | Q4 ‖ Q5 |
| 300 ... 360 | R5 | Q5 | Q4 ‖ Q5 | Q5 ‖ Q6 |
| 0 ... 60 | R6 | Q6 | Q5 ‖ Q6 | Q6 ‖ Q1 |

Figures 3A, 3B:
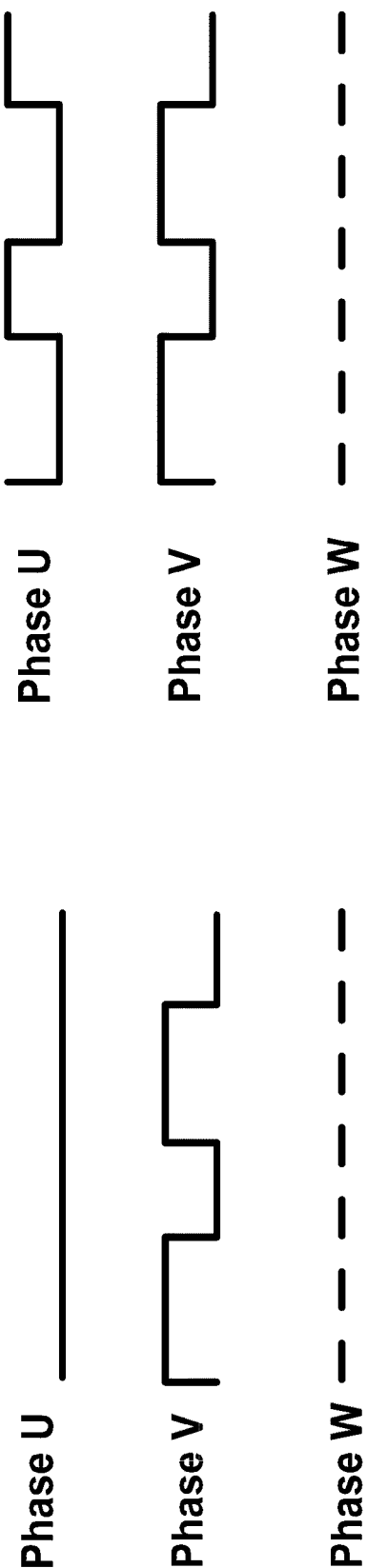
FIG. 3a schematically illustrates the PWM driving wave forms applied to the BLDC motor in order to drive current Q2 of FIG. 2 under soft switching operation.
FIG. 3b schematically illustrates the PWM driving wave forms applied to the BLDC motor in order to drive current Q2 of FIG. 2 under hard switching operation.

Turning now to the driving wave forms applied, FIG. 3a shows the torque producing signal applied to phases U, V, W with a soft switching PWM modulation to achieve current direction Q2. The ration of hi-time to lo-time of phase V is the torque producing PWM duty cycle. FIG. 3b shows the equivalent torque generating signal for hard switching PWM duty cycle modulation. In both cases phase W is undriven.

Turning now to FIGS. 4a and 4b, these illustrate the application of both the torque generating signal and the alternating signals of the present invention. Taking FIG. 4a, the soft switching PWM Q2 signal is applied. Consulting table 1, the alternating signals to be applied are Q1‖Q2 and Q2‖Q3 that is Q1 in parallel with Q2 (+I_12) and Q3 in parallel with Q2 (+I_23). As shown in FIG. 4a, Q1‖Q2 is achieved from the start of the sequence to the point I_12(n) and Q2‖Q3 is achieved from the rising edge on phase W to I_23(n). The cycle then repeats. In this cycle, Q2 is driven for approximately two thirds of the cycle period and Q1 or Q3 is driven in parallel with Q2 for approximately one third of the cycle period each. Referring back to FIG. 2b, it should become apparent that the resultant torque of equal combinations of Q1 and Q3 is in the Q2 direction. Accordingly, the desired torque production is not unduly affected by the application of the alternating signals. In the example shown in FIG. 4b, there is hard switching PWM on Q2 accordingly, the cycle includes phases where there are reversed signals −I_12 and −I_23, but the overall net currents are +I_12 and +I_23.

In order to determine the amplitude of the oscillating currents +I_12 and +I_23 produced by the alternating signals, samples are taken at the indicated times I_12(n) and I_23(n) respectively and again in successive cycles. Monitoring the variation in amplitude over successive cycles allows the commutation point to be detected.

Turning to FIG. 5, the BLDC motor is driven by six N-channel transistors, enabling each motor phase U, V, W to be connected to the supply voltage ($V_{BAT}$) or via a common shunt resistor Rshunt to ground (GND). The voltage over Rshunt is amplified and fed to an analogue-to-digital converter (ADC) with preceding sample and hold circuit (S&H). The ADC start-of-conversion command (SOC) is provided by the Timer & Synchronization Unit. The timer and synchronization unit aligns the SOC with the driving signals so that the ADC can provide samples which are representative for the magnitude of the alternating currents to the sample unit.

The PWM Modulation Module drives the 6 N-channel power transistors. It receives a PWM pattern from the PWM pattern unit and modulates that onto the clock input. It also provides a reference signal to the Timer and Synchronisation unit so that this unit can synchronize the current sampling instances. The PWM Pattern generation unit receives the current rotor position information (sector) and the torque producing PWM duty cycle command inputs. In response thereto the PWM pattern unit selects the appropriate PWM pattern in order to superimpose the torque generating signal and two alternating signals according to the present invention. The appropriate signals are selected from table 1, as was described previously.

The amplitude of the oscillating currents generated by the alternating signals is compared to each other. In the example motor considered herein the difference between the magnitude of the two oscillating currents reaches a local maximum at the commutation point. Since the difference between two oscillating currents is considered, the algorithm is robust against current variations, which might result from varying battery supply voltages or varying coil resistances due to temperature, for example.

Figure 6:
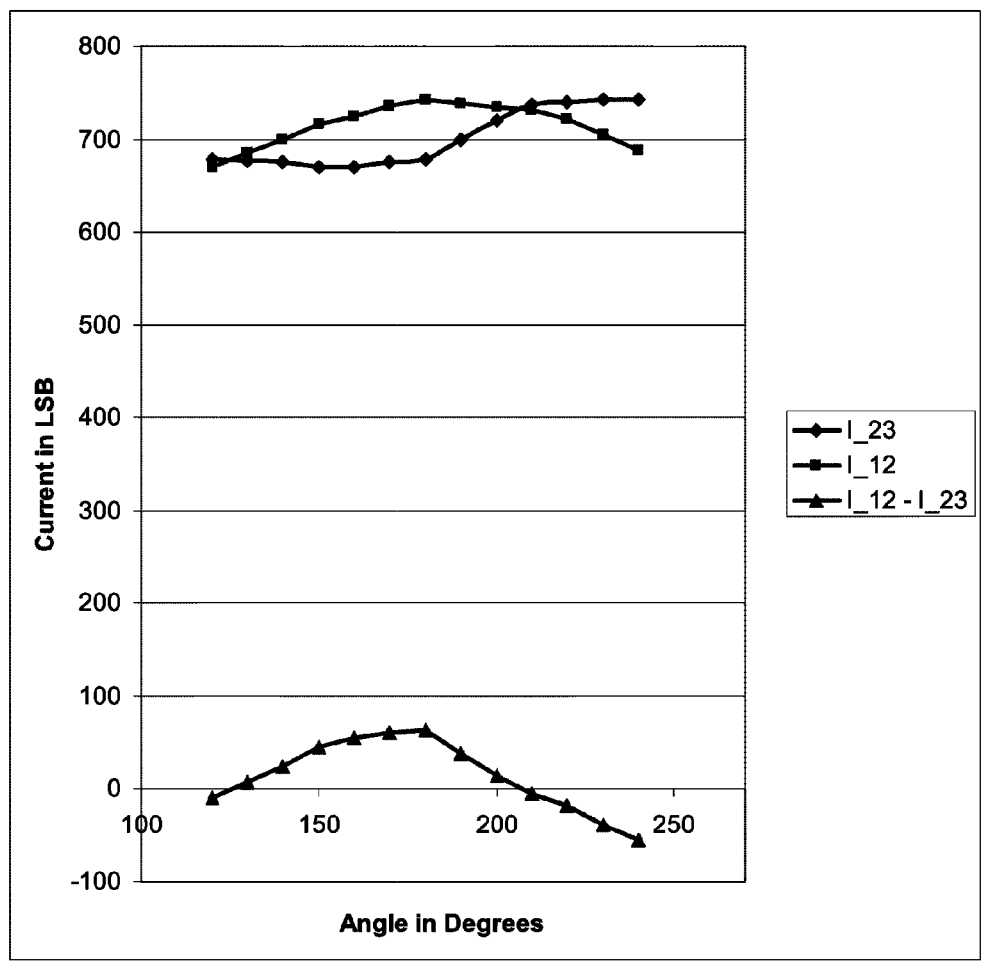
FIG. 6 illustrates the variation of the oscillating current magnitude with rotor position according to one embodiment.

FIG. 6 shows measurements that were taken on a motor test stand for a 400 W automotive BLDC motor with 4 pole pairs. The two currents I_12 and I_23 were measured by a 10-bit ADC converter via a 1 mOhm shunt resistor and a current sense amplifier with gain 50. The two currents were sampled while the rotor was locked at a given angle. FIG. 6 shows the values of I_12, I_23 and I_12-I_23 vs. the rotor position. The difference I_12-I_23 reaches a maximum at 180°, the commutation point. At this point, a commutation command can be generated.

Turning back to FIG. 5, the low pass filter removes noise and provides samples to the Falling Edge Detection Unit. The Falling edge Detection unit is enabled by the Settling Detection Filter. In one implementation, the Settling Detection Filter enables the Falling Edge Detection Unit once a predetermined interval has occurred since a Commutation Command was given by the Falling Edge Detection Unit. In some more sophisticated implementations, the Settling Detection Filter may also monitor the measured currents to determine when a ringing disturbance on the motor currents caused by the application of a new PWM pattern (after each commutation command) has sufficiently decayed.

The occurrence of a Commutation Command causes the Rotor Position Variable to be incremented in a way to point to the next sector, i.e. R1 becomes R2, R2 becomes R3, R3->R4, R5->R6 and R6 becomes R1.

In order to better understand the implementation of FIG. 5, FIG. 7 shows the output of the low pass filter, the Commutation Command generated by the Falling Edge Detection Unit and the ENABLE signal generated by the Settling Detection Filter for the example motor running at around 100 rpm. It can be seen that in this implementation some hysteresis was built inside the Falling Edge Detection Unit in order to guarantee robust operation under noisy automotive environments.

The method works for star and delta constructed motors and is independent on the number of coils per motor phase and on the number of poles of the rotors permanent magnet. Whilst the invention has been described with relation to BLDC motors, the skilled man will appreciate that it can also be applied to switched reluctance motors. The method has been explained above with relation to clockwise rotation. The skilled man will of course appreciate that the same techniques can be applied with suitable adjustment to anticlockwise rotation.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of determining a rotor position in an electric motor, the method comprising:

superimposing at least a first and a second alternating signal onto a driving waveform so as to generate a first oscillating current in a first pair of stator coils and a second oscillating current in a second pair of stator coils included in the electric motor; and determining the rotor position based on monitoring a variation of a difference value between amplitudes of the first oscillating current and amplitudes of the second oscillating current.

2. A method as claimed in claim 1 further including estimating an initial rotor position by applying test pulses or by evaluating BEMF voltage in an undriven coil.

3. A method as claimed in claim 1 wherein the driving waveform is operated with a PWM duty cycle.

4. A method as claimed in claim 3 wherein the driving waveform is operated with either a soft switching PWM duty cycle or a hard switching PWM duty cycle.

5. A method as claimed in claim 1 wherein the alternating signals are adapted such that they have a net torque effect in the same direction as the driving waveform.

6. A method as claimed in claim 1 wherein the rotor position is determined by reference to maxima or minima in the monitored currents.

7. A method as claimed in claim 1 wherein the rotor position is determined by reference to a plurality of sectors, each sector being defined by two commutation points.

8. A method as claimed in claim 7 wherein the difference value between amplitudes of the oscillating currents reaches a minima or maxima at the commutation points.

9. A method as claimed in claim 8 wherein when the rotor is at a commutation point, a commutation command is output.

10. A method as claimed in claim 9 wherein in response to the commutation command the driving waveform is commutated.

11. An electric motor, comprising:

stator coils;

a first unit configured to superimpose at least a first and a second alternating signal onto a driving waveform so as to generate a first oscillating current in a first pair of stator coils and a second oscillating current in a second pair of stator coils; and a second unit configured to determine a rotor position based on monitoring a variation of a difference value between amplitudes of the first oscillating current and amplitudes of the second oscillating current.

12. An electric motor as claimed in claim 11 wherein the motor is a switched reluctance motor or a brushless direct current (BLDC) motor.

* * * * *